T. W. McKIERNAN.
STREET CAR FENDER.
APPLICATION FILED APR. 8, 1913.
1,075,155.
Patented Oct. 7, 1913.
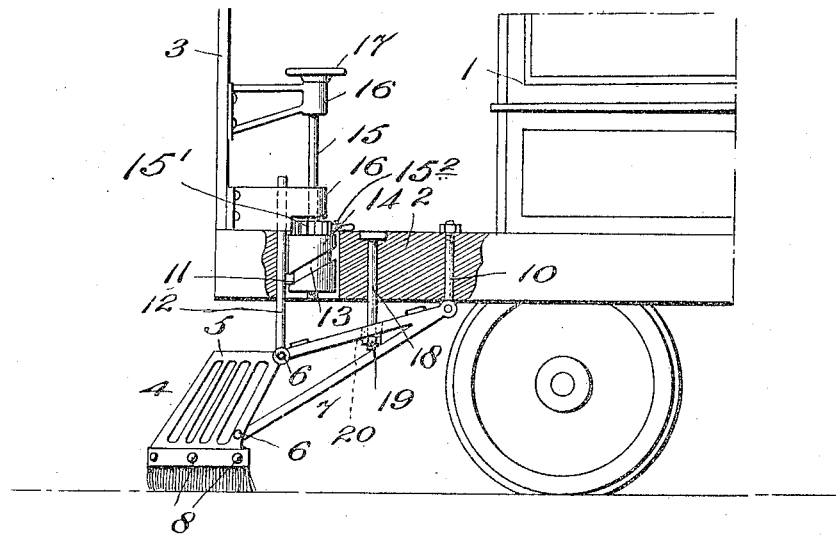
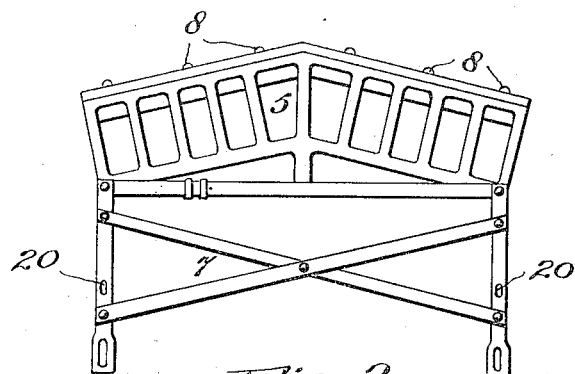
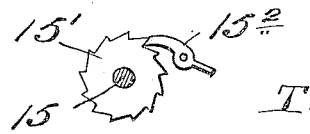
Inventor
Thomas W. McKiernan
By Victor J. Evans
Attorney
Witnesses

UNITED STATES PATENT OFFICE.

THOMAS W. McKIERNAN, OF POTTSVILLE, PENNSYLVANIA.

STREET-CAR FENDER.

1,075,155. Specification of Letters Patent. Patented Oct. 7, 1913.

Application filed April 8, 1913. Serial No. 759,761.

*To all whom it may concern:*

Be it known that I, THOMAS W. McKIERNAN, a citizen of the United States, residing at Pottsville, in the county of Schuylkill and State of Pennsylvania, have invented new and useful Improvements in Street-Car Fenders, of which the following is a specification.

This invention relates to street car fenders and has for its object to provide a device of this character that will be of a simple, cheap and efficient construction and one which may be readily connected to the ordinary street cars now in use.

To these ends the invention consists in the novel details of construction and combination of parts more fully hereinafter described and particularly pointed out in the claim.

Referring to the accompanying drawings forming a part of this specification in which like numerals designate like parts in all the views: Figure 1 is a view partly in section, of a portion of a car body equipped with my improved fender; Fig. 2 is a plan view of the fender and supporting frame removed from the car, and Fig. 3 is a detail view of the ratchet and pawl for holding the fender in any adjusted position.

The car body 1 provided with the platform 2 and dashboard 3 has connected thereto my improved fender 4. The fender comprises the frame 5 which is preferably of the shape shown in the drawings and is connected by means of the bolts 6 to the supporting frame 7, which supporting frame is adapted to rigidly hold the fender suspended beneath the front portion of the platform 2. Connected to the lower portion of the fender by means of the bolts 8, is a pliable brush 9, which when in its lower position is adapted for sweeping the tracks and for preventing small obstructions from becoming engaged with the wheels of the car.

The supporting frame 7 is pivotally connected at its rearward ends to the platform of the car, by means of the eye-bolts 10 and is adapted to be raised and lowered through the action of the cam roller 11 mounted on the upwardly extending rod 12 operating in the cam groove 13 of the cam 14. The cam 14 is mounted on the lower end of the shaft 15 which is mounted in bearings 16 connected to the inner side of the dash-board and is provided on its upper end with a hand wheel 17 by means of which the fender may be raised and lowered by the motorman, when desired. A ratchet wheel $15^1$ is also mounted on the shaft and is adapted to be engaged by a pawl $15^2$ pivotally mounted on the platform of the car. This pawl and ratchet is provided for holding the frame of the fender in any adjusted position. Bolts 18 held to the platform 2 and provided at their lower ends with adjusting nuts 19, are adapted to operate within slots 20 in the frame 7 and further support the fender above the track. The hand wheel for controlling the adjustment of the fender is located within easy reach of the motorman, preferably adjacent the means for controlling the motive power of the car. The upwardly extending rod 12 is also mounted within the bearing 16 which guides it in a vertical position when it is operated by the action of the cam 14.

The fender is normally held in a slightly elevated position above the tracks by means of the frame 7 and when it becomes necessary to lower the same, whenever a person is on the track, the motorman, by the use of his foot, quickly disengages the pawl $15^2$ from the ratchet $15^1$, thereby allowing the fender, by reason of the pitch of the cam groove to drop automatically to its lower or track engaging position as shown in Fig. 1. The fender on account of its construction, pushes the person to one side of the track and thereby prevents him from getting beneath the wheels of the car as now sometimes happens.

Whenever it becomes necessary to use the brush for removing snow or otherwise cleaning the tracks, the fender is operated as above described.

It is obvious that those skilled in the art may vary the details of construction and arrangements of parts without departing from the spirit of my invention and therefore I do not wish to be limited to such features except as may be required by the claim.

What is claimed as new is:

In combination with a car body, a fender pivotally connected to the body, a shaft journaled upon the body and provided with a member having a cam groove, a rod pivoted to the fender and having a roller located in said groove.

In testimony whereof I affix my signature in presence of two witnesses.

THOS. W. McKIERNAN.

Witnesses:
 VICTOR FREED,
 F. S. FREILER.

Copies of this patent may be obtained for five cents each, by addressing the "Commissioner of Patents, Washington, D. C."